Patented Nov. 10, 1942

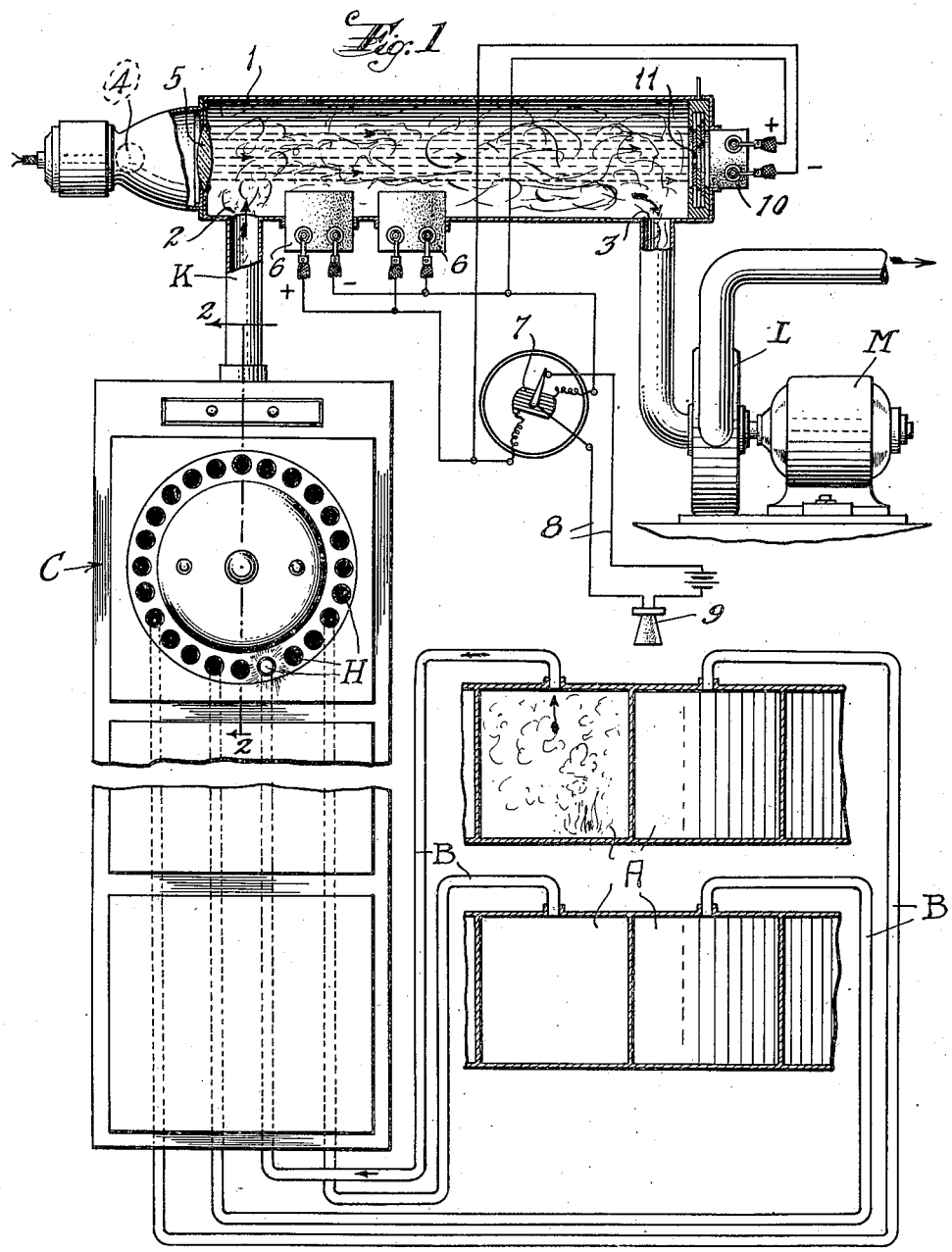

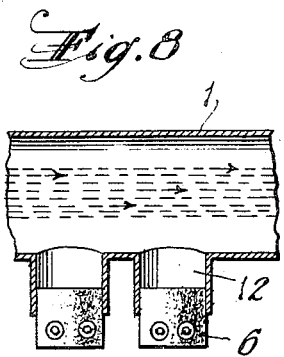
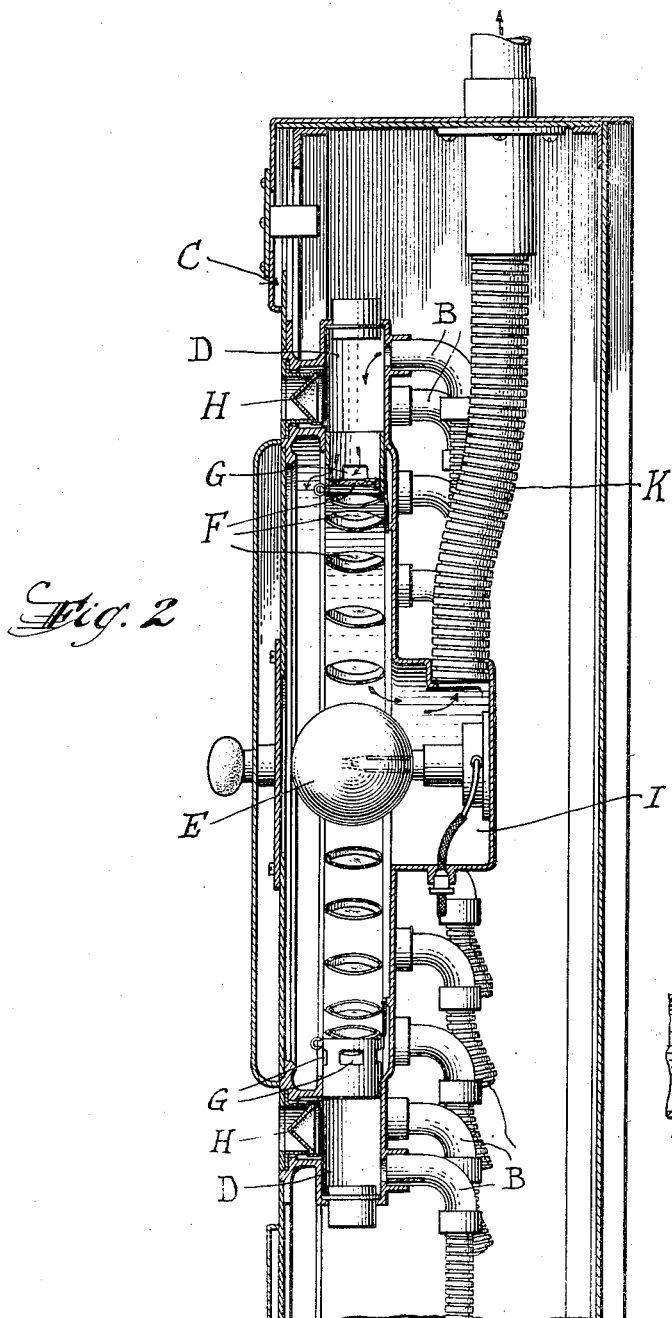
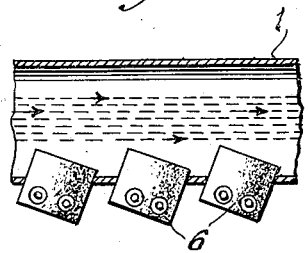

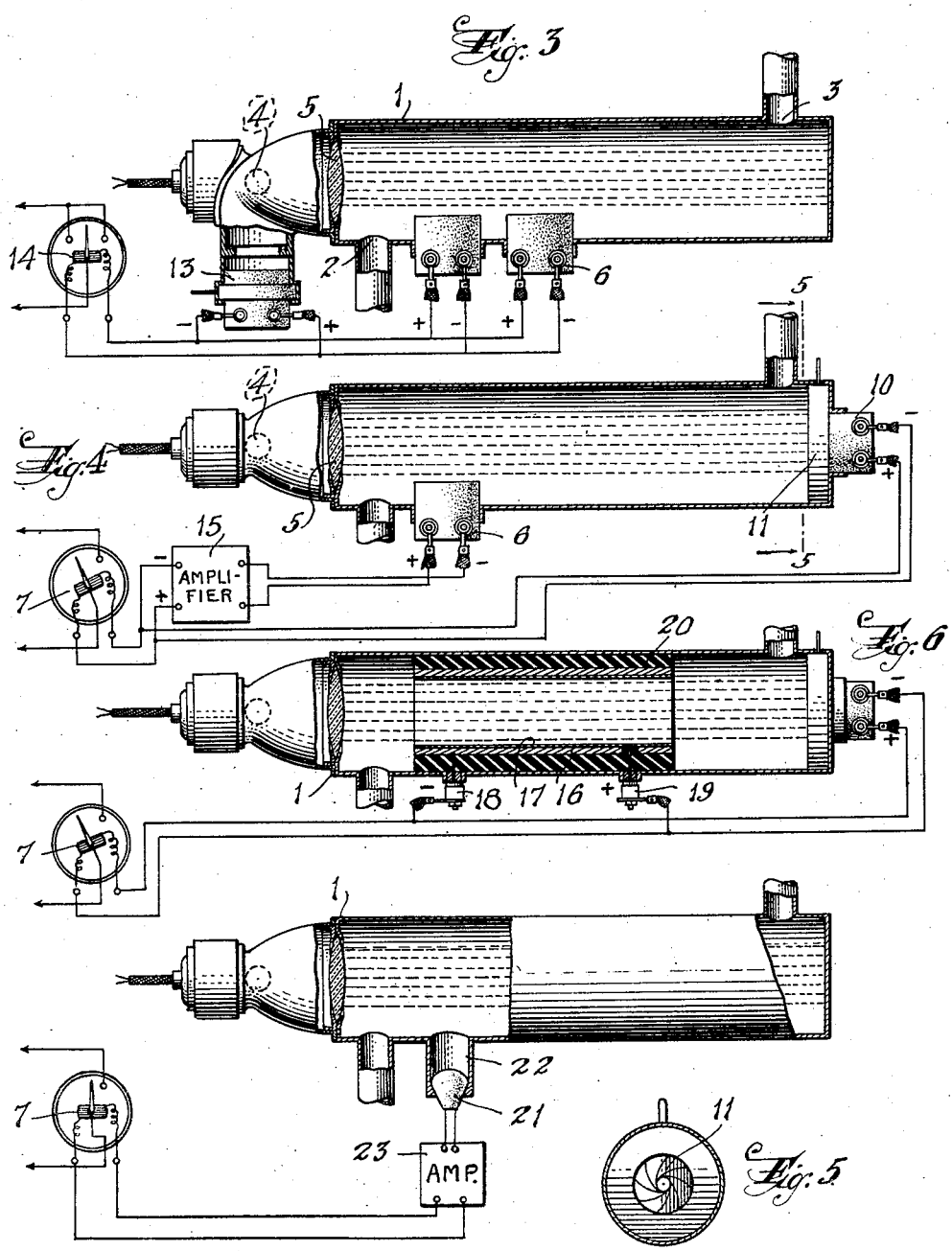

2,301,367

UNITED STATES PATENT OFFICE 2,301,367

SMOKE DETECTOR AND SIGNAL

Clarence Noel Cahusac, Newark, and Frank B. Allen, Verona, N. J., assignors to C-O-Two Fire Equipment Co., Newark, N. J., a corporation of Delaware Application March 19, 1940, Serial No. 324,792

3 Claims. (Cl. 177—311)

This invention relates in general to apparatus to be used for example in ships, warehouses, factories and vaults, for detecting and announcing the existence at a point remote from the apparatus, of a fluid having particles of matter suspended therein, such as smoke. For example, the invention contemplates apparatus for detecting and announcing in the wheel-house or on the bridge of a ship, the presence of smoke in a hold of the ship, to ensure immediate warning of fires and prompt action to extinguish them.

More particularly, the invention is directed to such apparatus of the photoelectric type wherein smoke is caused to pass from the zone of combustion into proximity to a source of light and a current-generating photoelectric cell that is sensitive to light from said source and is connected in circuit with an electrical measuring instrument or relay, whereby said instrument or relay is responsive to variations in the electricity generated in said circuit due to fluctuations in the intensity of light affecting said cell caused by the smoke.

It has been difficult to obtain adequate sensitivity of such apparatus to smoke highly diluted with clear air, or conversely air or fluid containing only a small percentage of solid matter in suspension. Also, to obtain satisfactory operation of such apparatus, light sources of high wattage have been necessary, which is costly. Furthermore, to prevent variations in intensity or candlepower of the electric light source and thus ensure reasonably accurate results from the apparatus, it has been necessary to provide voltage regulating systems which are expensive and complicate the apparatus.

Therefore, a prime object of our invention is to provide apparatus of the general character described which shall embody novel and improved features of construction that shall obviate or overcome the foregoing objections to and disadvantages of known apparatus and which shall have a high degree of sensitivity to fluids containing suspended matter, shall permit the use of an electric lamp of low wattage, shall not require any voltage regulator for said lamp, and shall be reliable in operation.

Other objects are to utilize in a novel and improved way the reflection of light rays from suspended matter in the fluid or smoke being detected for photoelectrically generating electricity; and to use such electricity for producing a signal.

A further object is to utilize in a novel and improved manner the photoelectric effects of light rays reflected from the suspended matter in a fluid stream and light rays transmitted through said fluid stream; and thus to produce a differential, compensating or opposing relation between the photoelectric effects of said reflected rays and said transmitted rays, whereby to ensure high sensitivity in the apparatus under all conditions.

Other objects, advantages and results of the invention will appear from the following description when read in conjunction with the accompanying drawings in which Figure 1 is a schematic view, with portions shown in side elevation and other portions shown in vertical longitudinal section, of an apparatus embodying our invention.

Figure 2 is an enlarged transverse vertical sectional view taken on the line 2—2 of Figure 1.

Figure 3 is a schematic vertical longitudinal sectional view through a smoke detecting unit showing a modification of our invention.

Figure 4 is a similar view showing a further modification of the invention.

Figure 5 is a transverse vertical sectional view on the line 5—5 of Figure 4.

Figure 6 is a view similar to Figure 3 showing another form of the invention.

Figure 7 is a similar view illustrating another modification of the invention, and Figures 8 and 9 are fragmentary vertical longitudinal sectional views through smoke detecting units showing other arrangements of photoelectric elements.

For the purpose of illustrating the principles of the invention, we have shown our smoke detector and signal in conjunction with a known type of visual smoke detecting system, but it should be understood that our invention is susceptible to use wherever it may be desired to detect or announce the existence of a fluid containing suspended matter.

Specifically describing the invention, the reference characters A designate compartments, rooms or spaces, for example holds of a ship, the presence of fire in which it is desired to detect and announce. From each of the compartments extends a pipe line B which discharges into a smoke detecting cabinet C, whereby smoke from all of a plurality of compartments A may be visually detected at the same central point of observation. For example, the cabinet C may be located on the bridge or in a wheelhouse of a ship, and all of the pipes B are adapted to convey smoke from their respective compartments or holds to the cabinet C. Each pipe B discharges into a viewing chamber D which constitutes one of a circular series of identical chambers into each of which one of the pipes B communicates. At the center of the circular series of chambers is an electric lamp E the rays of which enter all of the chambers through lens openings F of the chambers. Each chamber has outlets G for the smoke, and a sight opening H disposed between the inlet end of the corresponding pipe B and the outlet opening G. With this construction, when smoke travels through any of the chambers D, it will be illuminated by the light rays from the lamp E so as to be visible through the corresponding sight opening H.

The smoke from all of the chambers D is exhausted into a common outlet chamber I from which the smoke is drawn through a conduit K by a suitable pump such as a suction fan L which may be driven by an electric motor M. It will be understood that the suction fan L constantly circulates air from the compartments A through the chambers D so that the existence of a fire and incident smoke in any of the compartments A quickly will be discoverable in the corresponding sight opening H of the smoke detecting cabinet C.

In accordance with the embodiment of the invention illustrated on the drawing, our invention is utilized for detecting and announcing the existence of smoke in any of the holds or compartments A as that smoke is exhausted from the cabinet C. It will be observed that such smoke will be highly diluted with clear air because of the large number of compartments from which clear air is being drawn simultaneously with the withdrawal of smoke from a given one of the compartments, and accordingly great sensitivity in the detecting apparatus is necessary.

As shown, our invention includes a detecting unit which comprises a casing I having an inlet 2 connected to the exhaust conduit K and an outlet 3 connected to the inlet of the suction fan L. At one end of the casing I is a light source 4 which comprises an electric lamp and which directs its rays into and longitudinally of the casing I through a suitable lens 5 whereby the light rays, represented by the dash lines, are projected parallel to each other through the casing.

At least one photoelectric element 6 is mounted within the casing I at one side of the light beam so as to be sensitive to light rays reflected from the suspended matter in the stream of fluid entering the casing through the inlet 2. This photoelectric element may be of any suitable type, such as the current generating barrier-layer type or a photoelectric tube. As shown in Figure 1, there are a plurality of photoelectric elements 6 spaced from each other longitudinally of the light beam and having their light sensitive surfaces closely adjacent the outer boundaries of the light beam. The elements or cells 6 are connected in parallel circuit with each other and with a suitable electrical responsive device, for example a microammeter or, as shown, a relay 7 which controls another circuit 8 which may include any desired electrically operated device such as an audible signal 9.

With this construction, initially the photoelectric cell circuit is so adjusted that the relay 7 or other device will assume a normal condition, for example to open the circuit 8, when no smoke is present in the casing I, and when smoke or other fluid containing suspended matter is caused to flow through the casing I into the beam of light, some of the light rays will be reflected from the solid particles in the stream upon the photoelectric cell 6, whereupon the relay or other device 7 will be actuated by the current in the photoelectric cell circuit, for example to close the circuit 8.

In accordance with the invention, another photoelectric element 10 is mounted in the casing I so as to be responsive to light rays transmitted through the fluid in the casing. As shown, this photoelectric element 10 is disposed in direct alinement with the light beam, and an adjustable diaphragm 11, for example an iris diaphragm as shown in Figure 5, is interposed between the light source and the photoelectric element. This photoelectric element 10 is connected in circuit with the cells 6 and responsive device 7 in what is known as an "opposed parallel" arrangement, or so that the photoelectric effects of the cells 6 and the cell 10 are caused to operate in compensating, differential or opposing relation; in other words, the electrodes of the cell 10 are connected respectively to the opposite electrodes of the cells 6. It will be observed that the cells 6 will be continuously somewhat affected by stray light rays from the beam even when no smoke is present in the casing I, and the cells will be further affected by slight variations in the intensity or candle power of the light source 4, so that without some means such as the cell 10, to prevent it, disturbed or irregular and unsteady operation of the electrical responsive device 7 would result. By varying the size of the opening of the diaphragm 11, when no smoke is present in the casing I, the effect of the light on the cells 6 may be balanced by the effect of the light on the cell 10, whereby a steady and normal setting of the responsive device 7 may be obtained.

This arrangement also obviates the necessity of a voltage regulating apparatus for the light source 4, because the balance of the photoelectric cell circuit is maintained regardless of the intensity of the light source itself. The photoelectric cell circuit is unbalanced only by passage of smoke into the casing I.

The differential relation of the photoelectric cells 6 and 10 is also important when dense or black smoke is passing through the casing I, in which case much of the light is shut off by the smoke from the cell 10 whose opposition to the cells 6 is thereby reduced to compensate for the decreased reflection of light to the cells 6.

The balancing effect of the cell 10 to offset the photoelectric effects of stray light rays and variations in light intensity upon the cells 6, may also be obtained by locating the compensating or balancing cell 13, corresponding to the cell 10, outside of the casing I but so as to be responsive to rays from the light source 4, as shown in Figure 3. In such cases, however, it is desirable to utilize a zero-center responsive device or relay as indicated at 14 in Figure 3.

It will be observed that with our invention it is possible to locate the cells 6 closely adjacent to the light beam whereby great sensitivity is attained, as shown in Figure 1, but of course this close proximity of the light sensitive surfaces of the photoelectric cells to the light beam results in subjecting the cells to stray light rays. This could be partially obviated by setting the cells in recesses 12 in the walls of the casing as shown in Figure 8, or by tilting the light sensitive surfaces of the cells obliquely with respect to the light beam with said surfaces inclined away from the light source, as shown in Figure 9. Where such arrangement of the cells is adopted, the compensating or balancing cell 10 may be dispensed with as far as its function in balancing the photoelectric effects of the stray light rays and variations in light intensity upon the cells 6 is concerned.

While a plurality of cells are desirable in order to obtain adequate current for operation of the responsive device 7, if desired, an amplifier system 15 of known construction may be utilized in conjunction with one or more of the cells 6 as shown in Figure 4.

As above indicated, different types of light sensitive devices may be utilized, and in Figure 6 I have shown a tubular selenium cell which includes two layers 16 and 17 having the respective terminals 18 and 19. This cell is mounted in and insulated from the casing 1 by insulating material 20 so that the light beam from the source 4 passes through the opening in the tubular cell.

In Figure 7 we have shown a known type of photoelectric tube 21 which may be set in the casing as shown in Figure 1 or may be disposed in a recess 22 in the casing as shown in Figure 7. If desired an amplifier 23 may be connected in circuit with the tube, or a plurality of the tubes 21 may be connected in parallel circuit so as to avoid the necessity for an amplifier.

With certain types of photoelectric elements, for example selenium cells, it may be desirable to connect a source of electricity in series with the photoelectric element to provide adequate current for operating the responsive device 7, the light rays affecting the photoelectric element so as to vary the resistance of the circuit and thereby vary the strength of the current flowing in the circuit.

Various other modifications and changes in the details of structure and combination of the parts will occur to those skilled in the art as within the scope of the invention.

Having thus described our invention, what we claim is:

1. Apparatus for detecting suspended matter in a fluid, comprising means including a light source for producing a beam of light, means for conducting a stream of fluid into said light beam, a photoelectric element of the generative type located with respect to said beam and said fluid stream to receive light rays reflected from suspended matter in said fluid stream, the light sensitive surface of said photoelectric element being disposed in close proximity to the outer boundaries of said beam at one side thereof, another photoelectric element located to receive light rays transmitted through said fluid stream, means connecting said photoelectric elements in an electric circuit whereby the photoelectric effects of the second-mentioned element oppose the photoelectric effects of the first-mentioned element, an electrical responsive means in said circuit, and means for varying at will the extent of exposure of the second-mentioned photoelectric element to the light rays.

2. Apparatus of the character described comprising means including a light source for producing a beam of light, means for conducting a stream of fluid into said light beam, a current generating photoelectric element of the barrier-layer type located with respect to said beam and said fluid stream to receive light rays reflected from suspended matter in said fluid stream, the light sensitive surface of said photoelectric element being disposed substantially at the boundaries of said light beam in oblique relation to the light beam and inclined away from said light source so as to be shielded against stray direct rays from said light beam, and means responsive to the electricity generated by said photoelectric element.

3. Apparatus of the character described comprising means including a light source for producing a beam of light, means for conducting a stream of fluid into said light beam, a plurality of current-generating photoelectric elements located with respect to said light beam and said stream of fluid to receive light reflected from suspended matter in the fluid to generate electricity, another current-generating photoelectric element located to receive light rays transmitted through said fluid stream, an electric circuit including the first-mentioned photoelectric elements connected in parallel and the last-mentioned photoelectric element connected so that its photoelectric effects oppose the photoelectric effects of the first-mentioned photoelectric elements, means for varying at will the extent of exposure of said last-mentioned photoelectric element to the light rays, and electrical responsive means connected in said circuit and actuated by electricity generated by said photoelectric elements.

CLARENCE NOEL CAHUSAC.
FRANK B. ALLEN.